US011894706B2

(12) United States Patent
Lackey

(10) Patent No.: US 11,894,706 B2
(45) Date of Patent: Feb. 6, 2024

(54) STERILE BATTERY CHARGING DEVICE

(71) Applicant: Conmed Corporation, Utica, NY (US)

(72) Inventor: Michael J. Lackey, Tampa, FL (US)

(73) Assignee: Conmed Corporation, Utica, NY (US)

(*) Notice: Subject to any disclaimer, the term of this patent is extended or adjusted under 35 U.S.C. 154(b) by 188 days.

(21) Appl. No.: 17/420,276

(22) PCT Filed: Feb. 27, 2020

(86) PCT No.: PCT/US2020/020105
§ 371 (c)(1),
(2) Date: Jul. 1, 2021

(87) PCT Pub. No.: WO2020/146909
PCT Pub. Date: Jul. 16, 2020

(65) Prior Publication Data
US 2022/0094184 A1 Mar. 24, 2022

Related U.S. Application Data

(60) Provisional application No. 62/812,276, filed on Mar. 1, 2019, provisional application No. 62/790,076, filed on Jan. 9, 2019.

(51) Int. Cl.
*H01M 10/46* (2006.01)
*H02J 7/00* (2006.01)
(Continued)

(52) U.S. Cl.
CPC .......... *H02J 7/0045* (2013.01); *H02J 7/0013* (2013.01); *H02J 7/342* (2020.01); *H02J 50/10* (2016.02)

(58) Field of Classification Search
CPC ........ H02J 7/0042; H02J 7/342; H02J 7/0013; H02J 7/0045; H02J 50/10; Y02E 60/10
(Continued)

(56) References Cited

U.S. PATENT DOCUMENTS 7,236,243 B2 6/2007 Beecroft et al.
8,486,560 B2 7/2013 Tartaglia
(Continued)

FOREIGN PATENT DOCUMENTS

EP 3352324 7/2018
GB 2366101 2/2002
(Continued)

OTHER PUBLICATIONS

JP Office Action, App. No. 2021-539611, dated Jun. 13, 2022, pp. 1-16.
(Continued)

*Primary Examiner* — Edward Tso
(74) *Attorney, Agent, or Firm* — BOND, SCHOENECK & KING, PLLC; Frederick J. M. Price

(57) ABSTRACT

A sterile battery charging device and assembly for charging within a sterile field. The battery charging assembly includes a base unit having a first interface and a second interface. The assembly additionally includes a high capacity battery connectable to the first interface and a low capacity battery connectable to the second interface. The base unit retrieves power from the high capacity battery and transmits power to the low capacity battery. The high capacity battery and the low capacity battery are interchangeably connectable to the base unit.

14 Claims, 11 Drawing Sheets

(51) Int. Cl.
*H02J 50/10* (2016.01)
*H02J 7/34* (2006.01)

(58) Field of Classification Search
USPC .......................... 320/103, 107, 110, 114, 115
See application file for complete search history.

(56) References Cited

U.S. PATENT DOCUMENTS

| | | | |
|---|---|---|---|
| 10,044,197 B2 | 8/2018 | Fry et al. | |
| 2016/0020443 A1* | 1/2016 | White | H02J 5/00 318/245 |
| 2016/0023571 A1* | 1/2016 | Wu | B60L 53/20 320/112 |

FOREIGN PATENT DOCUMENTS

| | | |
|---|---|---|
| JP | 1989-138929 A2 | 5/1989 |
| JP | 2000-268883 A2 | 9/2000 |
| JP | 2014-529320 A2 | 11/2014 |
| JP | 2018-516036 A2 | 6/2018 |
| KR | 10-2014-0100239 A | 8/2014 |

OTHER PUBLICATIONS

International Search Report Form PCT/ISA/210, International Application No. PCT/US2020/020105, pp. 1-16 dated, May 27, 2020.
KR Office Action, Application No. 10-2023-7023139, dated Jul. 25, 2023, pp. 1-4.

\* cited by examiner

STERILE BATTERY CHARGING DEVICE

CROSS-REFERENCES TO RELATED APPLICATIONS

This application is a national stage application under 35 U.S.C. 371 based on international patent application PCT/US20/20105 filed on Feb. 27, 2020, which claims priority to and the benefit of U.S. Provisional Patent Application Ser. No. 62/790,076 filed on Jan. 9, 2019 and entitled "Sterile Battery Charging," and U.S. Provisional Patent Application Ser. No. 62/812,276, filed on Mar. 1, 2019 and entitled "Sterile Battery Charging," the entireties of which are incorporated herein by reference.

BACKGROUND OF THE INVENTION

1. Field of the Invention

The present invention relates to surgical power systems and, more particularly, to a sterile battery charging device and assembly.

2. Description of Related Art

Batteries used to power surgical equipment are typically sterilized prior to use so they can be used in the sterile field. When a battery runs out of power, it is replaced with a new battery. For smaller equipment, the battery life may be unreasonably short, requiring replacement of one or more times during the surgery. As this can be time-consuming, it would be useful to recharge the battery during surgery when the surgical instrument is not in use. This would effectively extend the runtime of the surgical instrument before the battery needs replacing.

Placing a corded battery charger in the sterile field to accomplish this task presents several undesirable challenges. The power cord connected to the charger and plugged into a power outlet can present a tripping hazard for people (e.g., surgeons and surgical nurses) are regularly walking between the sterile field and wall. The other challenge is with the sterile field itself. Having a power cord that runs between the sterile charger and the non-sterile power outlet presents an opportunity for contamination.

Therefore, there is a need for a self-contained battery charger with no external connections.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

BRIEF SUMMARY OF THE INVENTION

Embodiments of the present invention are directed to a sterile battery charging device and assembly for charging within a sterile field. According to one aspect, the device includes a base unit having a first interface and a second interface. The first interface is configured to receive a first battery and the second interface is configured to receive a second battery. The base unit retrieves power from the first battery and transmits power to the second battery. The first battery and the second battery are interchangeably attachable to the base unit.

According to another aspect, the assembly includes a base unit having a first interface and a second interface. The assembly additionally includes a high capacity battery connectable to the first interface and a low capacity battery connectable to the second interface. The base unit retrieves power from the high capacity battery and transmits power to the low capacity battery. The high capacity battery and the low capacity battery are interchangeably connectable to the base unit.

According to yet another aspect, the present invention is a method for charging surgical batteries. The method includes the steps of: (i) providing a base unit with power in a sterile field; (ii) sterilizing a battery; (iii) introducing the battery into the sterile field after sterilization; (iv) charging the battery with power from the base unit in the sterile field; (v) using the battery in a surgical procedure in the sterile field; and (vi) recharging the battery with power from the base unit in the sterile field.

These and other aspects of the invention will be apparent from and elucidated with reference to the embodiment(s) described hereinafter.

BRIEF DESCRIPTION OF THE SEVERAL VIEWS OF THE DRAWING(S)

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments. Reference is now made briefly to the accompanying drawings, in which.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
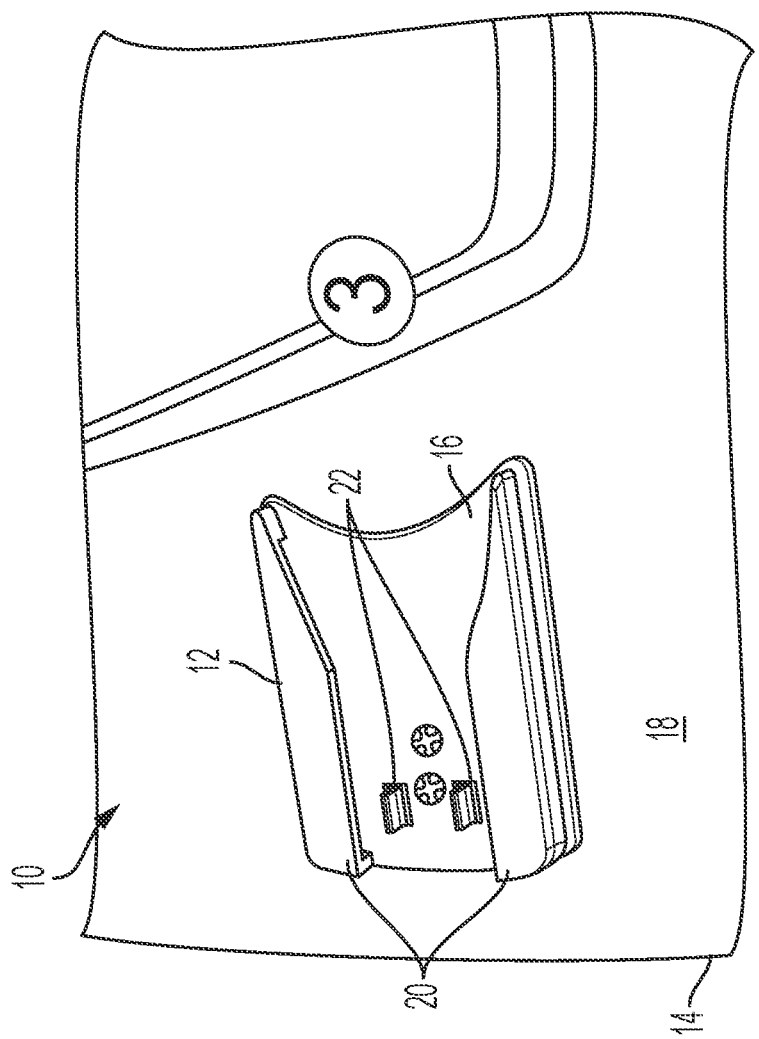
FIG. 1 is a perspective view schematic representation of a base unit, according to an embodiment.
Figure 6:
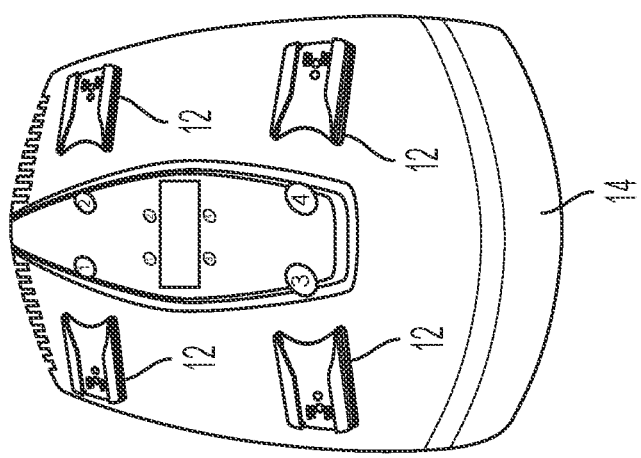
FIG. 6 is a perspective view schematic representation of a surgical power system, according to an embodiment.

Referring now to the figures, wherein like reference numerals refer to like parts throughout, FIG. 1 shows a base unit 12 of a sterile battery charging device 10. The base unit 12 is shown removably attached or fixed to a surgical power system 14. An exemplary surgical power system 14 is the Hall® Powered Instrument System. In the depicted embodiment, the surgical power system 14 is a Hall® Lithium Charger (FIG. 6). The surgical power system 14 has one or more base units 12 connected thereto. According to an embodiment wherein the surgical power system 14 is the Hall® Lithium Charger, there are four base units 12 connected to the Hall® Lithium Charger 14, as shown in FIG. 6. The surgical power system 14 can be positioned on a table-top or wall-mounted for surgical procedures.

Still referring to FIG. 1, the base unit 12 is substantially planar and rectangular. In the depicted embodiment, the base unit 12 has a plate 16 connected to a surface 18 of the surgical power system 14. The base unit 12 additionally includes a first interface 20 and a second interface 22. The first interface 20 is used to connect to a high capacity battery 24 for retrieving power from the battery 24. Thus, the first interface 20 is used as the power source of the sterile battery charging device 10 and is responsible for providing the charging power. The second interface 22 is used to connect to a low capacity battery 26. As a result of the interchangeable attachment of the high capacity battery 24 and the low capacity battery 26 to the base unit 12, power can be pulled from the high capacity battery 24 and then transferred to the low capacity battery 26.

Figure 8:
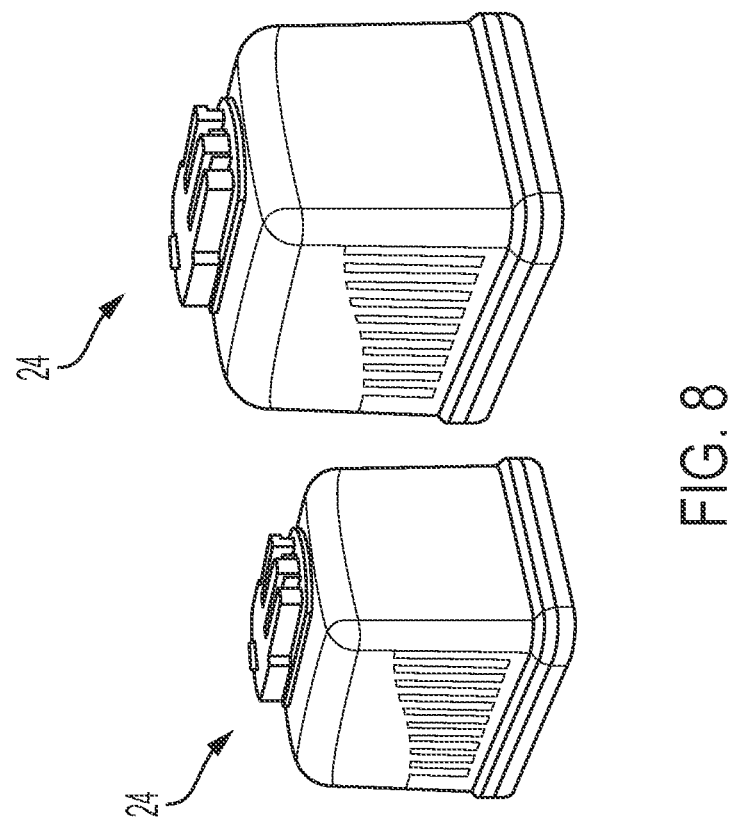
FIG. 8 is a perspective view schematic representation of high capacity batteries, according to an exemplary embodiment.
Figure 9:
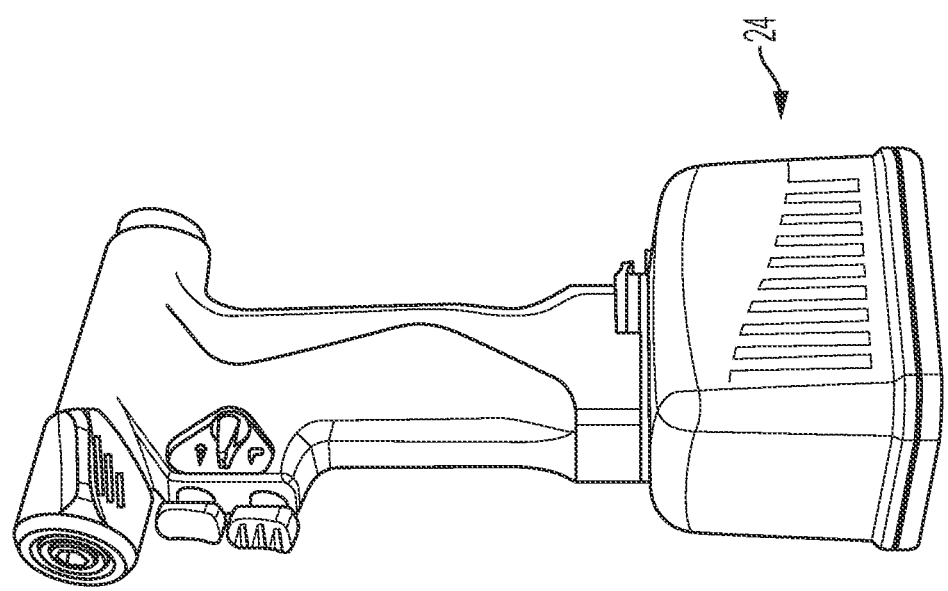
FIG. 9 is perspective view schematic representation of a high capacity battery attached to a large surgical instrument, according to an exemplary embodiment.

In an embodiment, the first interface 20 is one or more battery rails. Specifically, as shown in FIG. 1, the first interface 20 is a pair of spaced battery rails connected to the plate 16 of the base unit 12. The battery rails 20 extend substantially parallel to each other along and/or over the plate 16 of the base unit 12. The battery rails 20 are designed to connect to the sterilizable, high capacity battery 24. High capacity batteries 24 are used with large surgical instruments, such as a saw handpiece. They provide consistent, long-lasting power for large bone and total arthroplasty procedures. Exemplary sterilizable, high capacity batteries 24 are shown in FIG. 8. The high capacity battery 24 (including the embodiment shown in FIG. 8) is fully autoclavable and can be a Lithium battery.

Figure 7B:
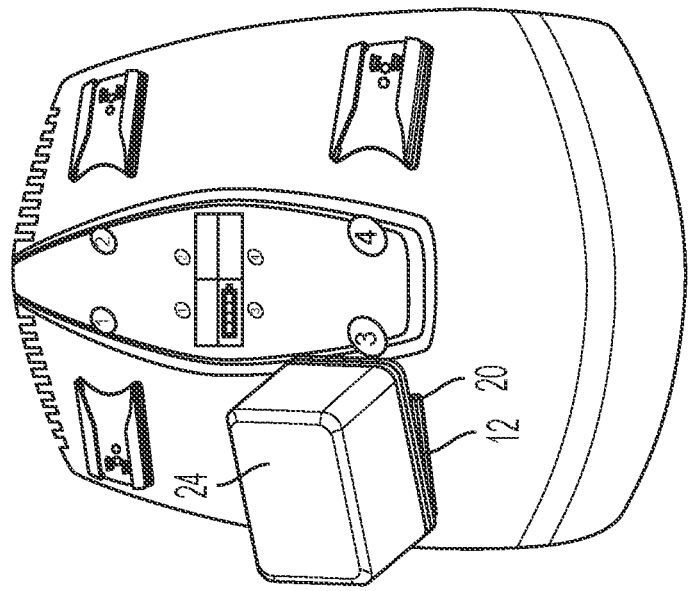
FIG. 7B is a perspective view schematic representation of the high capacity battery connected to the base unit, according to an embodiment.
Figure 7A:
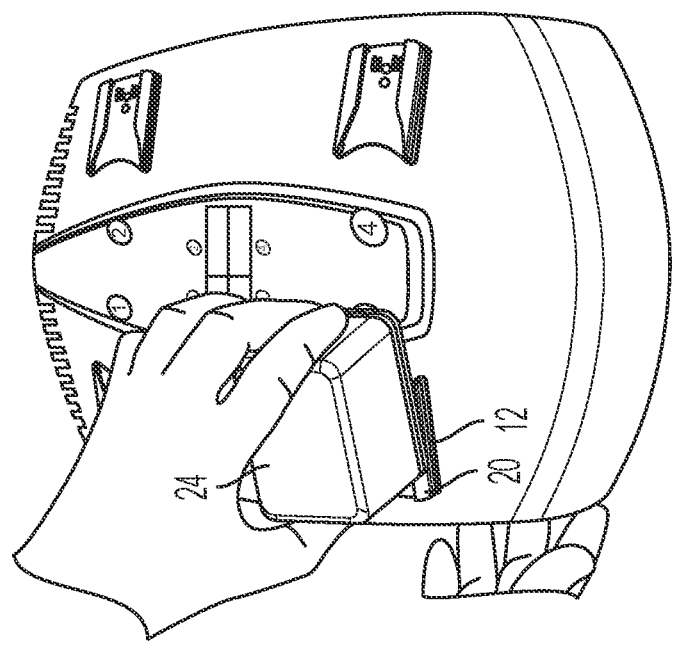
FIG. 7A is a perspective view schematic representation of a high capacity battery sliding into the base unit, according to an embodiment.

In order to pull power from a high capacity battery 24, the high capacity battery 24 is attached to the base unit 12. Specifically, as shown in FIGS. 7A and 7B, the high capacity battery 24 slides between the battery rails 20 on the base unit (FIG. 7A) until the high capacity battery 24 locks into place or otherwise achieves a draining/charging position on the base unit 12 (FIG. 7B). The battery rails 20 hold the high capacity battery 24 in place while the base unit 12 pulls power from the high capacity battery 24.

Figure 11:
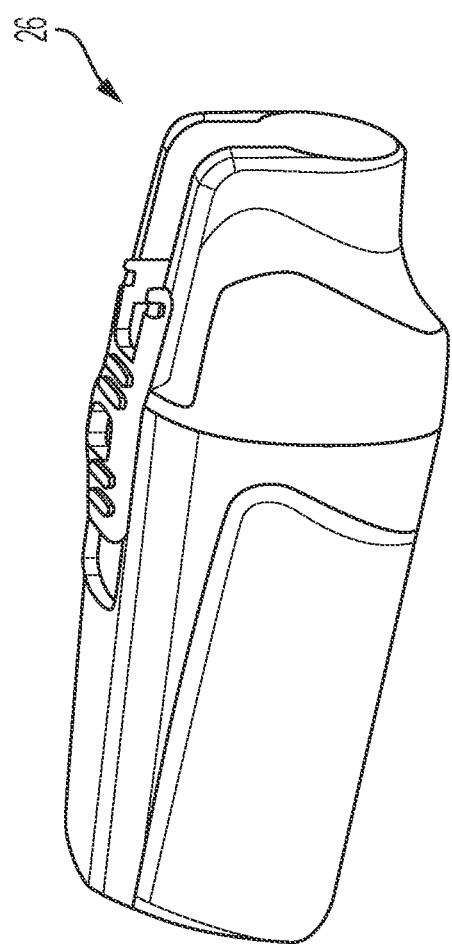
FIG. 11 is a perspective view schematic representation of a low capacity battery, according to an exemplary embodiment.

Still referring to FIG. 1, the second interface 22 is one or more battery contacts. In the depicted embodiment, there are two battery contacts 22 on the base unit 12. The battery contacts 22 are adapted to connect to the sterilizable, low capacity battery 26. Low capacity batteries 26 are used with small, precise surgical instruments, such as drills, shaver blades, and burs. These low capacity batteries 26 are compact and lightweight. They provide strong, reliable power for surgical procedures including small bone, sports medicine, and light trauma. An exemplary sterilizable, low capacity battery 26 is shown in FIG. 11. The low capacity battery 26 (including the embodiment shown in FIG. 11) is fully autoclavable and can be a Lithium battery.

In an alternative embodiment, the base unit 12 is adapted for wireless charging (e.g., inductive charging via a primary coil in the base unit 12). (A secondary coil would extend through the low capacity (instrument) battery 26, as understood by a person of ordinary skill in the art). Using wireless charging is advantageous as the low capacity (instrument) battery 26 may stay connected to the surgical instrument (e.g., shaver blade) during charging. The surgical instrument with connected low capacity (instrument) battery 26 must simply be placed in proximity to the sterile battery charging device 10 (i.e., base unit 12) for charging to occur.

Figure 4:
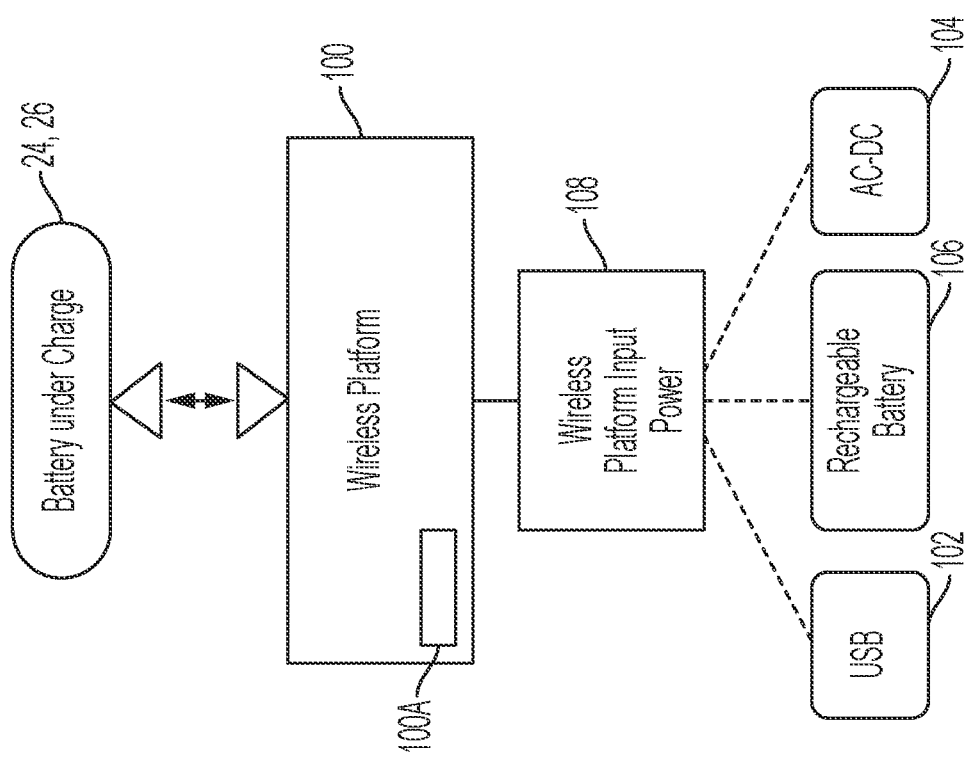
FIG. 4 is a flowchart of a wireless charging platform, according to an embodiment.

Turning now to FIG. 4, there is shown a flowchart of a wireless charging platform 100, according to an embodiment. A wireless charging platform 100 may be powered by a Universal USB 102, a common wall adapter power supply (e.g., AC-DC) 104, a rechargeable battery power bank 106, or a stand-alone power supply integrated into platform hardware 100A. The aforementioned power source alternatives provide power to the wireless charging platform 100 via a wireless platform power input 108. While this technique may involve the use of cables or wires, it allows the flexibility to use various input power arrangements. The platform hardware may be incorporated into support devices, such as surgical tables and instruments stands (e.g., Mayo stand), for example. Wireless charged accessories may include (but are not limited to): battery powered foot controls, tablets and/or laptops in sterile use, remote controls for console controls (e.g., cameras, pumps, light sources), and surgical lights and LEDs (e.g., handpiece lighting, helmets, and space suits).

Figure 5:
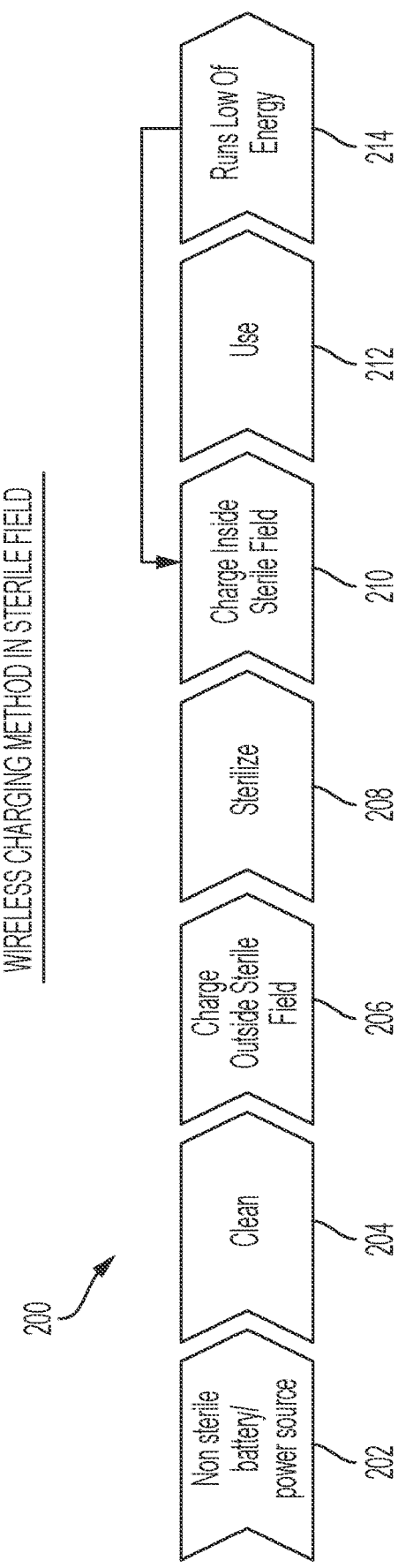
FIG. 5 is a flowchart of a wireless charging method, according to an embodiment.

A method 200 for wireless charging in a sterile field is shown and described with reference to the flowchart in FIG. 5. First, a non-sterile battery (or other power source), such as one of the high and low capacity batteries 24, 26, is obtained (step 202) and cleaned outside the sterile area (at step 204). The battery 24, 26 can then be charged outside the sterile field (step 206). Thereafter, the battery 24, 26 is sterilized (step 208). Sterilization can be completed using an autoclave or any other comparable, approved sterilization techniques. After sterilization, the battery 24, 26 is charged in the sterile field when in chargeable proximity to the base unit 12 (step 210). Thereafter, the battery 24, 26 can be used for a surgical procedure (step 212). When the battery 24, 26 has low power or otherwise has low energy levels, the battery 24, 26 is placed within chargeable proximity to the base unit 12 to recharge within the sterile field (steps 214, 210).

Alternatively, a battery pack could be reduced in physical size through use of a hybrid power system. A hybrid power system incorporates a smaller rechargeable cell or battery with a super capacitor boost circuit connected to the cell or battery. The super capacitor can be charged at a fast rate (<10 seconds) when compared to the rechargeable cell or battery. This type of powered surgical system could be charged on top of a typical instrument stand with the charger platform.

Figure 2:
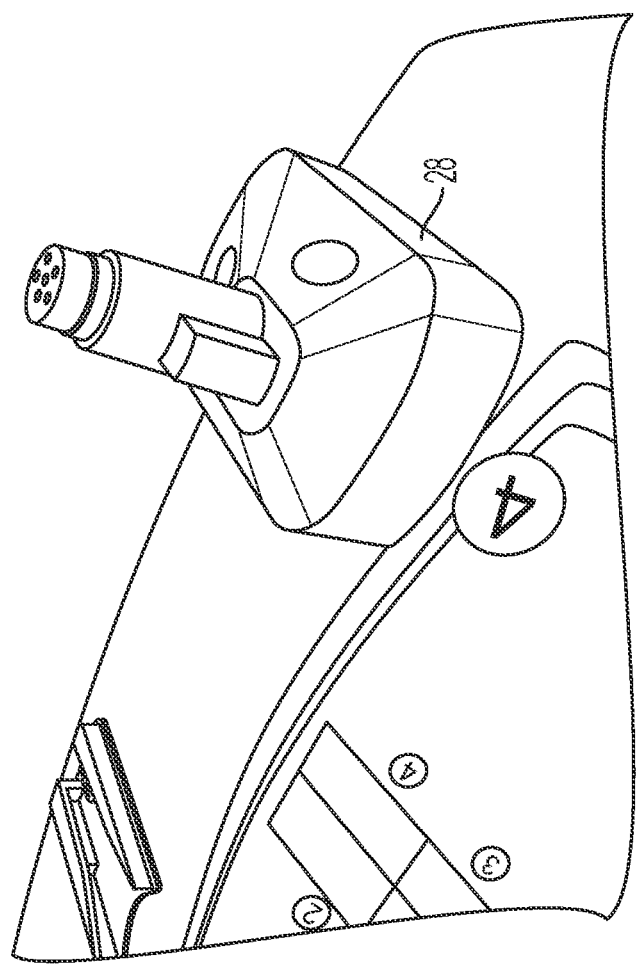
FIG. 2 is a perspective view schematic representation of an adapter connected to the base unit, according to an embodiment.
Figure 10:
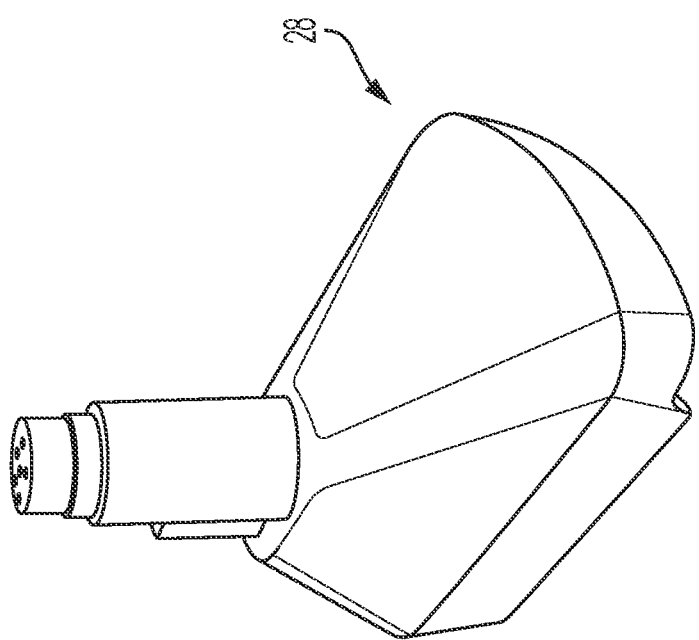
FIG. 10 is perspective view schematic representation of the adapter of FIG. 2.

Turning now to FIG. 2, there is shown a perspective view schematic representation of an adapter 28, according to an embodiment. The adapter 28 allows for connection of the low capacity battery 26 to be charged (as may be necessary; low capacity battery 26 can directly connect in another embodiment). In the embodiment shown in FIG. 2, the adapter 28 is a L3500 Small Bone Lithium Power Adapter (FIG. 10). The adapter 22 is configured to connect with the low capacity battery 26 for charging. In the embodiment shown in FIG. 10, the L3500 Small Bone Lithium Power Adapter 28 is adapted to connect to a sterilizable, low capacity (instrument) battery 26 such as that shown in FIG. 11.

Figure 3:
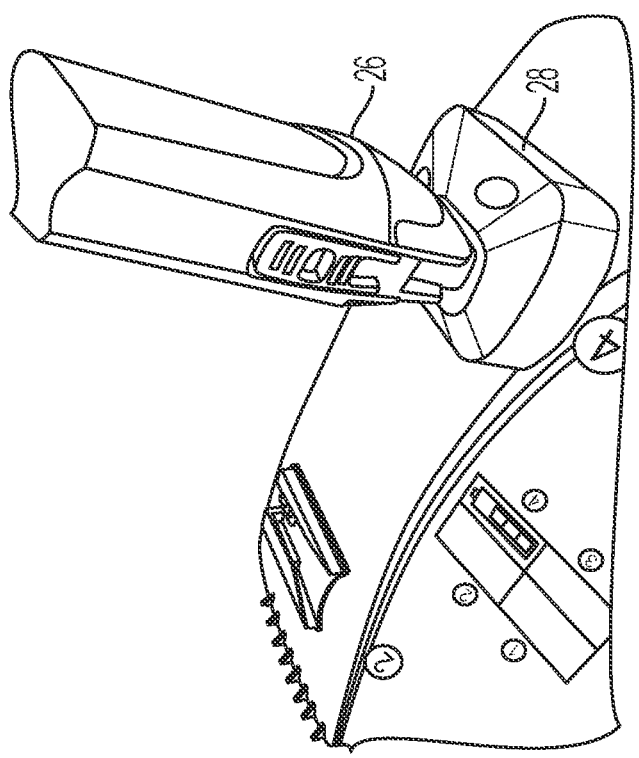
FIG. 3 is a perspective view schematic representation of a low capacity (instrument) battery connected to the adapter of FIG. 2.

Referring now to FIG. 3, there is shown a perspective view schematic representation of the low capacity battery 26 connected to the adapter 28. A partially discharged low capacity (instrument) battery 26 is connected to the adapter 28, initiating the charging effect. In an embodiment, the high capacity battery 24 is drained as the low capacity battery 26 is charged due to the number of base units 12 attached and available on the surgical power system 14. Multiple high capacity batteries 24 may be used to increase the runtime of one low capacity battery 26. Or, multiple low capacity batteries 26 may be charged at one time. The connection to the low capacity battery 26 may be through a physical connection (e.g., pins on the base unit 12) or through a wireless connection. A wireless connection does not require the low capacity battery 26 to be removed from the surgical instrument whereas the wired connection does.

The advantage of using an existing high capacity battery 24 as a charger power source is twofold. First, the high capacity battery 24 is already available due to its use in complimentary devices. Second, it is designed to be sterilized. Thus, the number of batteries 24, 26 used for surgery can be lowered as a depleted battery 24, 26 can be replaced with a charged battery 24, 26, decreasing the time required to change batteries 24, 26, which interrupts surgery.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A battery charging device, comprising:
    a number of base units each having a first interface and a second interface, the first interface configured to receive a first battery and the second interface configured to receive a second battery;
    a first of the number of base units is configured to retrieves power from the first battery wherein when the first battery is attached to a second of the number of the base units and transmits power to the second battery wherein when the second battery is attached to the first of the number of the base units; and
    both the first and second interfaces of each of the number of base units are located on a position where the first battery and the second battery are interchangeably attachable.

2. The device of claim 1, wherein the base unit is substantially planar.

3. The device of claim 1, wherein the base unit is substantially rectangular.

4. The device of claim 1, wherein the first interface is a pair of spaced and substantially parallel rails extending along each of the number of base units.

5. The device of claim 4, wherein the first battery is slidable within the pair of spaced and substantially parallel rails.

6. The device of claim 1, wherein the second interface is one or more battery contacts.

7. The device of claim 1, wherein the first and second batteries are sterilizable.

8. A battery charging assembly, comprising:
    a number of base units each having a first interface and a second interface;
    a high capacity battery connectable to the first interface;
    a low capacity battery connectable to the second interface;
    a first of the number of base units is configured to retrieves power from the high capacity battery wherein when the high capacity battery is attached to a second of the number of base units and transmits power to the low capacity battery wherein when the low capacity battery is attached to the first of the number of the base units; and
    both the first and second interfaces of each of the base units are located on a position where the high capacity battery and the low capacity battery are interchangeably connectable.

9. The assembly of claim 8, further comprising an adapter connected between the second interface and the low capacity battery.

10. The assembly of claim 9, wherein the low capacity battery is an instrument battery connectable to the adapter.

11. The assembly of claim 8 wherein the first interface is a pair of spaced and substantially parallel rails extending along each of the number of base units.

12. The assembly of claim 11, wherein high capacity battery is slidable within the pair of spaced and substantially parallel rails.

13. The assembly of claim 8, wherein the second interface is one or more battery contacts.

14. The assembly of claim 8, wherein the high capacity battery and the low capacity battery are sterilizable.

* * * * *